United States Patent [19]

Florence

[11] 4,101,968
[45] Jul. 18, 1978

[54] SORTER WITH OVERLAP OPERATION

[75] Inventor: Judit Katalin Florence, Menlo Park, Calif.

[73] Assignee: The Singer Company, Binghamton, N.Y.

[21] Appl. No.: 784,221

[22] Filed: Apr. 4, 1977

[51] Int. Cl.² .............................................. G06F 7/24
[52] U.S. Cl. ................................................... 364/900
[58] Field of Search ... 364/200 MS File, 900 MS File

[56] References Cited

U.S. PATENT DOCUMENTS

| 3,996,585 | 12/1976 | Hogan et al. | 340/324 AD |
|---|---|---|---|
| 4,030,077 | 6/1977 | Florence et al. | 364/900 |

Primary Examiner—Gareth D. Shaw
Assistant Examiner—Thomas M. Heckler
Attorney, Agent, or Firm—Paul Hentzel; Jeffrey Rothenberg

[57] ABSTRACT

An initial input list in a series of sequential dependent input lists is clocked through a first sort stack and written into a first buffer as Q groups of P numbers each. The P numbers are in numerical order within each group with the smallest number in the first location of each group. The first number in each group is loaded into a second sort stack which arranges them in numerical order, causing the smallest number in the input list to form the first number in the initial output list. A replacement number is numerically sorted into the second stack from the Q groups each time the smallest remaining number is clocked out. Each replacement number is from the next location of the same Q group as the most recently clocked out number. Thus, the smallest remaining number in any of the Q groups of the first buffer is always available to the second stack and appears as the smallest remaining number in the second stack is always in the first location of the second stack.

As the contents of the first buffer are inserted in to the second stack, the first sort stack processes a next input list into a second buffer. The buffers read and write in overlap manner permitting both sort stacks to process input lists simultaneously. As each smallest remaining number of the initial list becomes available at the output of the second stack, it may be updated and returned to the input of the first stack as an element of the subsequent dependent list. The double buffer overlap operation approximately doubles the throughput rate and permits updating of the dependent lists.

15 Claims, 2 Drawing Figures

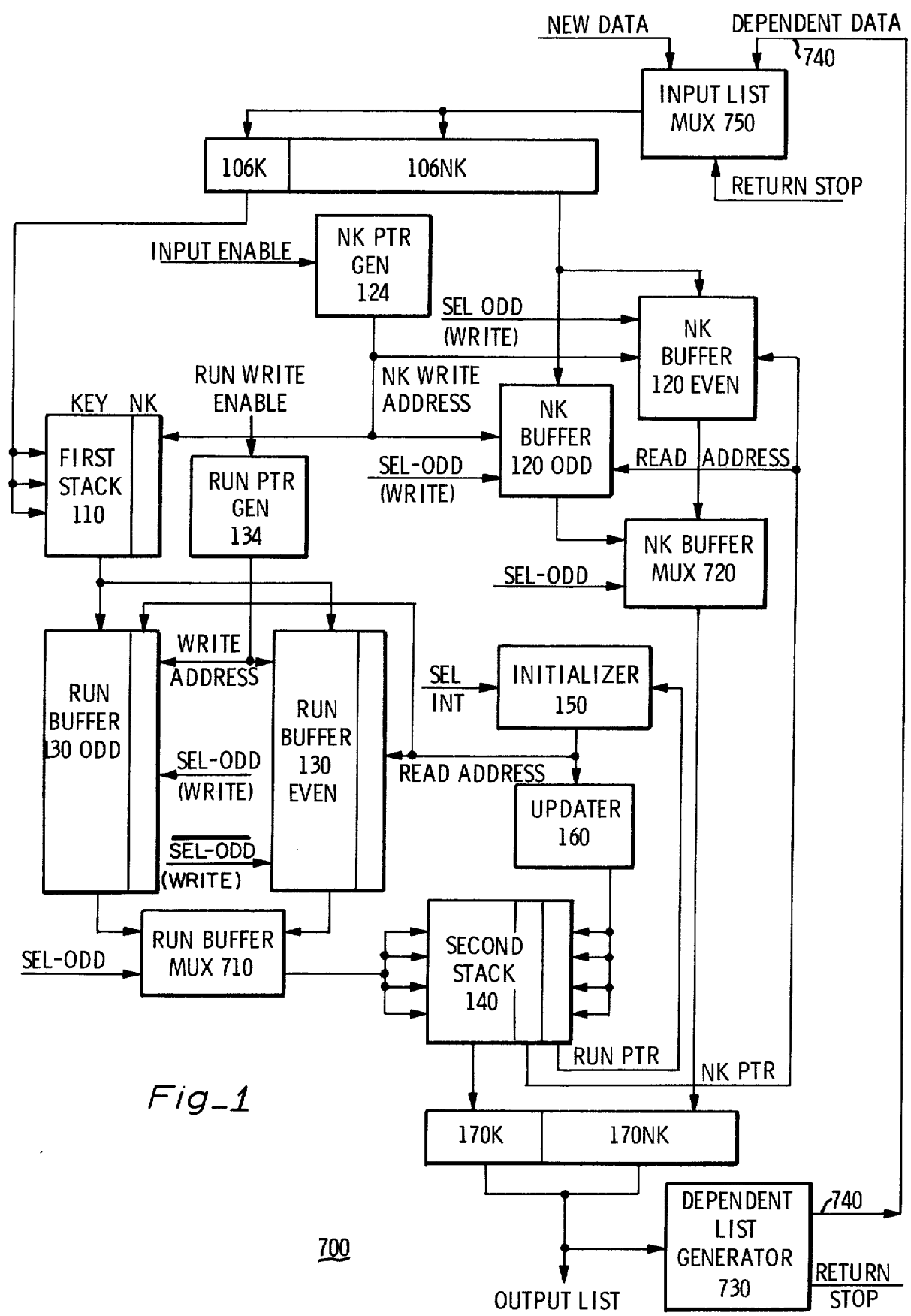
Fig_1

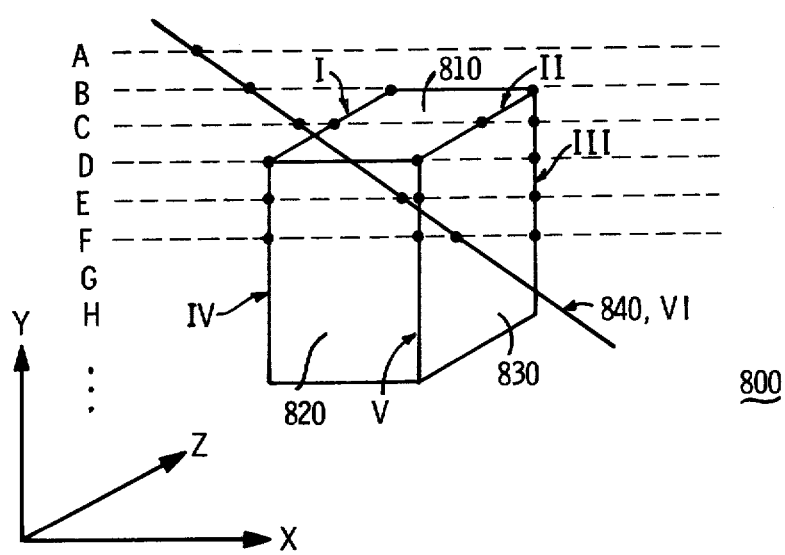
Fig_2

SORTER WITH OVERLAP OPERATION

BACKGROUND OF THE INVENTION

1. Field of the Invention

This invention relates to fast numerical sorting and more particularly a double-buffered, two-pass sorter wherein the two-sort passes are performed simultaneously.

2. Description of the Prior Art

Heretofore, numerical sorting was done primarily by relatively slow software programs. The limited sorting hardware that was available is based on a cumbersome comparison technique which sometimes required more comparator elements than words in the input list. In some instances the circuitry required increased geometrically as the number N of elements in the input list expanded. Further, these prior art hardware and software sorters are not fast enough for CRT display applications. U.S. Pat. No. 4,030,077 issued June 14, 1977 teaches multipass hardware sorting with minimum circuit requirements. FIGS. 1-6 of this specification, and the detailed description associated therewith, are from the above U.S. patent.

SUMMARY OF THE INVENTION

It is therefore an object of this invention to provide a hardware numerical sorter for sorting a series of sequential input lists, which:
- is faster;
- simultaneously processes a plurality of the sequential input lists;
- minimizes idle time between sorting sequential lists;
- receives unsorted input items and provides sorted output items substantially continuously;
- has a high throughput rate; and
- sorts dependent lists.

BRIEF DESCRIPTION OF THE DRAWING

Further objects and advantages of the multipass sorter and the operation of the numerical sort stack will become apparent from the following detailed description taken in conjunction with the drawings in which:

FIG. 1 is a block diagram of a two-pass overlap sorter with double buffer storage between stages; and FIG. 2 illustrages a CRT display generated by the dependent list capability of the FIG. 1 overlap sorter.

DESCRIPTION OF THE PREFERRED EMBODIMENTS

FIGS. 1 through 6 and the detailed description thereof (column 2, line 24 to column 8, line 68) of U.S. Pat. No. 4,030,077 by J. Florence and M. Rohner are incorporated hereinto by reference.

Simultaneous Sorting with Double Buffering

FIG. 1 shows a high-speed embodiment of a two-pass sorter 700 with a read-write overlap operation for allowing two input lists to be processed simultaneously. The odd runs are written from first stack 110 into run buffer 130 ODD while the even runs are sorted into second stack 140 from run buffer 130 EVEN. First stack 110 continuously sorts to run buffers 130 ODD and EVEN alternately. In the FIG. 1 embodiment of U.S. Pat. No. 4,030,077, first stack 110 was idle between input lists as the single run buffer 130 was in one of two modes: either receiving runs from stack one or outputting runs into second stack 140. Control signals SEL-ODD and SEL-ODD bar control the read-write status of run buffers 130 ODD and EVEN and NK buffers 120 ODD and EVEN. Run buffer multiplexer 710 is responsive to SEL-ODD to select the proper run buffer output for sorting into second stack 140. NK buffer multiplexer 720 similarly provides the proper NK buffer output to NK output register 170 NK. Dependent list generator 730 is responsive to NK data for returning specific items to input register 106 through return line 740 and input list multiplexer 750.

Dependent List

A sequence of lists are dependent if some or all items of one list are related to, or are the same as, the items of a subsequent list. The KEY of the item in list $n$ may be a function of the KEY in list $n-1$ and the NK portion of the item. This can be expressed by a general equation:

$$KEY\ (n) = f\ (KEY[n-1],\ NK)$$

EXAMPLE OF DEPENDENT LIST SORTING

FIG. 2 shows a digitally generated raster scan image 800 of polygons 810, 820, 830 and a line 840. The polygons are the visible faces of a cube displayed on a raster scan device such as a CRT. Each face may be scanned at a particular intensity or color to reflect shading, etc. The scan lines of the raster, shown by dashed lines, are labeled A, B, C, D, E . . . . The edges of the polygons and line 840 intersect the scan lines at points shown by dots (data points) shown in FIG. 2. The sorter 700 may be employed in the digital image generation circuitry to arrange these intersections or data points in increasing order of the x position coordinate. In this application of sorter 700, there is an input list for every scan line, the items of the list are the data points, the KEY is the X coordinate of the data point, and the NK portion is the remainder of display data such as: the slope or shift in x coordinate between adjacent scan lines, the scan line on which the edge starts, the number of scan lines the edge spans, the color and intensity of the polygon and other paramenters.

The sorter 700 arranges the data points in each scan line in order of their KEY'S or X values. The data points appear in sorted order in output registar 170. Dependent list generator 730 updates the KEY of each item for the next list by adding an X slope increment to the X coordinate. The updated KEYs are returned to input register 106 through input multiplexer 750. The dependent list generator also decrements the number of scan lines each edge spans by one.

Sorter 700 may be employed in the digital image generation circuitry which processes display data including new line and edge starts and intersections from a data base to a CRT display device. Sorter 700 receives an unsorted input list of edge start points (initial data points typically vertices) for each CRT scan, and arranges the start points numerically by X coordinate (horizontal position) in order of appearance within each scan. In the FIG. 2, application of sorter 700, the KEY is the X position data and the NK is the remainder of the display data. The inner points (dependent data points between the vertices of each edge) which form the body of each edge are generated by updating the associated initial data or start point for that edge. The start point updating involves two types of NK data in two separate operations as follows:

(1) Update Increment — Delta X

The update increment is the slope or change in X position of an edge between adjacent scans. The NK delta X of each data point is added to the KEY of that data point (X position) and returned to input register 106 through input multiplexer 750, to form the X coordinate for a dependent data point, in the next list. The dependent data point is displayed in the next scan line as a point displaced by delta X from the data point in the previous scan line of that edge.

(2) Update Cycle Number — L

The length of each line determines how many times the initial data point must be updated to display the entire edge. The update cycle number is decremented by one each cycle as it passes through dependent list generator 730. When the update cycle number equals zero, a RETURN STOP signal is forwarded to input list multiplexer 750 causing it to deselect that data point from the next list and select a new initial data point from the input if there is one.

Dependent list generator 730 may be formed by:

(1) A set of four bit adders (74283) for adding the update increment (delta X) to the KEY (X);

(2) Another set of four bit adders (74283) for decrementing the update cycle number L by adding −1 thereto; and (3) A zero detect circuit for providing a RETURN STOP signal to input list multiplexer 750.

I claim as my invention:

1. A two stage sorter which receives dependent sequential scan line lists each having N or less initial data items, and sorts the data items according to one position coordinate thereof to form raster scan lines of ordered data for displaying edges of polygon faces on a raster scan display device in which thhe direction of scan is parallel to the one position coordinate, the two stage sorter comprising:

means for grouping the N or less data items of each scan line list into Q groups of data items;

a first stage sorter means for numerically ordering the data items within each of the Q groups according to the one position coordinate;

interstage storage means for holding the Q groups of ordered data items;

a second stage sorter means for forming a single ordered scan line list of all of the N or less data items, by receiving from the interstage storage means and sorting the first data item of each group, and then continuously outputting the first data item in the second sorter and receiving and sorting the next data item from the same group as the previously outputted data item; and dependent item means responsive to the N or less data items in the single order scan line list from the second sorter means for providing dependent data items and forwarding the dependent data items to the means for grouping to be sorted into a subsequent scan line list.

2. The two stage sorter of claim 1, wherein the interstage storage means comprises a pair of interstage storage buffers which simultaneously process a subsequent scan line list and a preceding scan line list by alternately writing the Q groups of sorted data items from the subsequent scan line list from the first stage into one buffer and reading the Q groups of sorted data items from the preceding scan line list into the second stage from the other buffer.

3. The two stage sorter of claim 2, wherein the two scan line lists are adjacent scan lines, and the dependent item means is responsive to selected data items from the preceding scan line list from the output of the second stage for providing dependent data items for the subsequent scan line list.

4. The two stage sorter of claim 3, wherein each of the initial data items has a key portion, which is arranged into numerical order by the sorters, and a nonkey portion.

5. The two stage sorter of claim 4, wherein the dependent item means selectively provides dependent items in response to the nonkey portion of the data items in the preceding scan line list from the second stage sorter means.

6. The two stage sorter of claim 5, wherein the nonkey portion of each of the N or less initial data item contains the starting value of the one position coordinate of a particular edge of a face to be displayed on the raster scan display device, and further contains the number of scan lines (L) required to display the entire particular edge, and the dependent item means further comprises:

decrement means for decrementing L by one each time a dependent item is provided for the particular edge so that the nonkey portion of each dependent item contains the number of scan lines left to be displayed for the particular edge.

7. The two stage sorter of claim 6, wherein the nonkey portion of each data item contains the change in the one position coordinate (DELTA) of the particular edge over the distance between adjacent scan lines, and the dependent data item means further comprises:

increment means for incrementing the one position coordinate by DELTA to form the one position coordinate for the dependent item in the next scan line list.

8. The two stage sorter of claim 7, wherein the means for grouping groups N data items into S2 equal groups of S1 data items each wherein S2 × S1 = N.

9. The two pass sorter of claim 7, wherein the means for grouping groups the less than N data items into less than S2 equal groups of S1 data items each plus a single remainder group of less than S1 data items.

10. The two stage sorter of claim 9, wherein the first stage sorter means has S1 sorting locations for ordering the S1 or less data items in each group.

11. The two stage sorter of claim 10, wherein the second stage sorter means has S2 sorting locations for ordering each replacement data item from each of the S2 groups in the interstage storage means.

12. The two stage sorter of claim 11, wherein the one position coordinate in each data item is the X coordinate along the horizontal direction, and DELTA is the change in the X position coordinate per standard change in the Y position coordinate as defined by the vertical spacing between scan lines on the raster scan display device.

13. The two stage sorter of claim 12, wherein a pair of nonkey storage means retains the nonkey portion, and a nonkey pointer means provides the nonkey storage address of each nonkey portion to the first stage.

14. The two stage sorter of claim 13, wherein each of the stages includes a sorting stack comprising:

stack input means for sequentially receiving each of the numbers stored in one of the preceding pair of buffers;

comparing means for comparing each currently received number to the previously received numbers currently in the sorting stack;

pushdown storage means for inserting each currently received number into proper numerical order among the previously inserted numbers, which pushdown storage means progressively fills up from a first position to a last position as each currently received number is inserted;

interstage output means for advancing the current number in the last position to the next stage; and pointer means for identifying the next-to-be received number from one of the preceding pairs of buffers which is the next number from the same group as the current number in the last position; and output means for receiving the ordered numbers from the sorting stack in the last stage.

15. The two stage sorter of claim 14, wherein the first stage includes a sorting stack comprising:

stack input means for sequentially receiving all of the numbers within each of the groups;

comparing means for comparing each currently received number to the previously received numbers from the same group; and stack storage means for inserting each currently received number into proper numerical order among the numbers previously received from the same group.

* * * * *